3,376,131
RECOVERY OF ALUMINUM FROM
MERCURY SOLUTION
Walther Schmidt, Henrico County, Va., assignor, by direct and mesne assignments, of one-half to Reynolds Metals Company, Richmond, Va., a corporation of Delaware, and one-half to Nora International, Milan, Italy, a corporation of Bahama Islands
Filed June 4, 1965, Ser. No. 461,363
14 Claims. (Cl. 75—68)

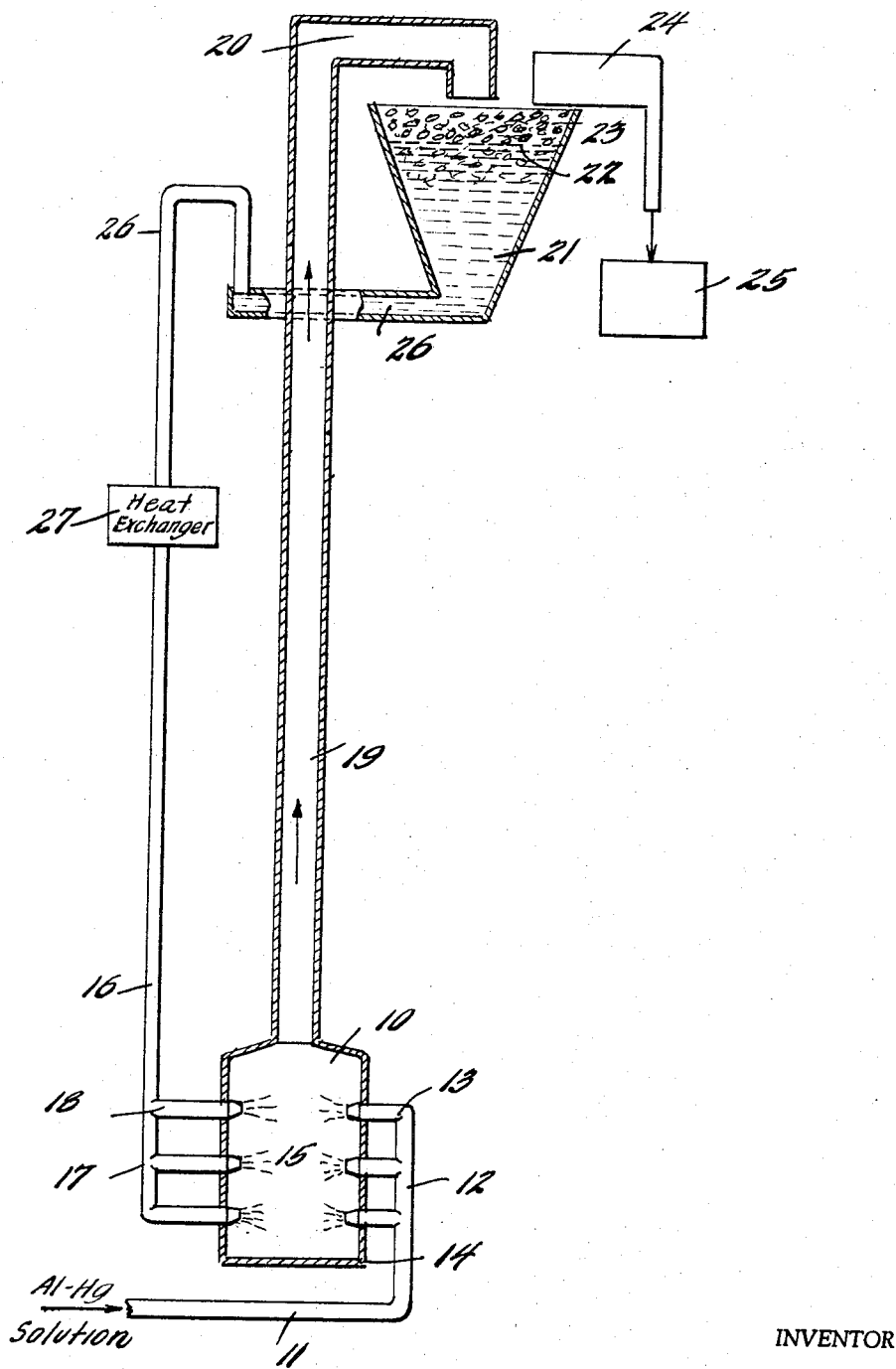

ABSTRACT OF THE DISCLOSURE

This invention is concerned with a process for the recovery of aluminum from solutions of aluminum in mercury involving the following steps:

(1) Rapidly cooling a solution of aluminum in mercury in a first stage pressure zone so as to form a slurry containing fine particles of aluminum;

(2) Rapidly transferring said slurry out of said pressure zone; and (3) Holding the slurry in a second stage for a period of time sufficient to allow the fine aluminum particles to recrystallize to larger crystals.

---

This invention relates to an improved process for the recovery and purification of aluminum from solutions of aluminum in mercury. More particularly, the invention concerns the recovery of aluminum from its solution in mercury by rapid cooling and preferably with dilution followed by controlled stepwise crystallization of the aluminum.

Methods have been proposed in the prior art whereby aluminum is extracted from materials in which it is available in metallic form by employing hot liquid extracting metals such as mercury and molten zinc. Thus, for example, by employing mercury at superatmospheric pressure at a temperature between about 500° C. and 650° C., aluminum can be separated from iron, silicon, titanium and similar impurities, which are insoluble in the liquid metal extractant.

In accordance with known methods, the aluminum is crystallized out of the solution. One of the problems in doing so is the fact that it must be done, substantially, while the Al-Hg mixture is under pressure. The following table illustrates the solubility of Al in Hg at various temperatures and pressures:

| Temp., °C.: | Weight percent Al in solution | Pressure, mm. Hg |
|---|---|---|
| 20 | 0.002 | 0.001. |
| 100 | 0.012 | 0.273. |
| 200 | 0.069 | 17.287. |
| 300 | 0.170 | 246.800. |
| 360 | 0.380 | 806.230 appr. boiling point. |
| 520 | Approx. 2.5–3 | 7,691.000. |
| 550 | Approx. 5–7 | 10,650.000. |
| 600 | Approx. 40 | 22.87 atm. |

In order to limit investment for mercury in relation to aluminum dissolved, commercial installations must use the range between 500 and 600° C. for the leaching step. A preferred temperature is approximately 550° C. As is evident from the table, the mere reduction of the temperature from 550 to 520° C. will drop out approximately half of the dissolved aluminum. Since 6 weight percent aluminum corresponds to 24 volume percent aluminum, approximately half of this volume would crystallize. Under pressure and temperature, the aluminum crystals stick to the apparatus and soon clog it and render it unsuitable for continuous operation. It has been proposed, in U.S. Patent 2,707,678, to crystallize aluminum from a mercury solution by allowing the solution to cool from the extraction temperature of about 500° C. to about 200° C. in a horizontal crystallizer, employing a rotating worm to loosen the aluminum crystals from the container surface. This involves equipment with moving parts with attendant complications. A rotating worm as proposed in said patent is fast covered with crystals. Ultimately the entire volume of the vessel will be full of an immovable aluminum mass.

It has long been known that upon slow cooling of the aluminum-mercury extract, coarse aluminum crystals are formed, whereas on very rapid cooling (quenching) a crystal slurry of very fine crystals having a pudding-like consistency is obtained. This pudding-like consistency remains easily movable and aluminum crystals in this consistency do not stick to apparatus. However, these crystals are so fine that they do not separate by buoyancy, but remain in suspension for days at room temperature and thus make recovery of the aluminum extremely difficult, as mentioned in the article in "Metall," vol. 3, page 12, January 1949. For the purpose of mechanical separation of a product in which the aluminum content is substantially enriched, it is essential to strive for coarse aluminum crystals. The literature also shows that coarser crystals may be obtained by cooling the aluminum-mercury solution to various temperatures ranging between 140 and 250° C. resulting in coarser crystals.

As observations have shown, such treatments resulted in a buoyant cream-like layer floating underneath the top level of the mercury. If, for example, a solution of 2 weight percent aluminum in mercury is quenched to 250° C., the "cream" on the top of the resulting unhomogeneous liquid, will be concentrated to approximately 6–7% aluminum in weight and will contain most of the total aluminum. Former practices which used this principle proceeded further by skimming the enriched top layer off and then mechanically densifying it, e.g. by squeezing it inside of a container, from which liquid mercury could rinse off. It needs a pressure of approximately 300 kg./sq. cm. to achieve a compacted mixture of about 30% aluminum in weight. For a commercial installation, rather heavy equipment would be required for compacting; also because the compressed aluminum crystals tend to stick to the dies and no lubricants are known which would not be floated away with the mercury, the friction in moving the compact out of the die is high with attendant seizing and die life as an economically limiting factor.

The present invention achieves a concentration of aluminum crystals in liquid mercury better than 20 weight percent aluminum and up to 35 weight percent aluminum without mechanical means of compacting.

In accordance with the present invention there is provided a process for the recovery of aluminum from solutions of aluminum in liquid metals, such as mercury, and which is based upon unique and novel principles.

The invention has for its principal object the recovery of aluminum from solutions thereof in liquid metals such as mercury, by a novel method which permits continuous operation.

A further object of the invention is the provision of a novel method for the rapid cooling of a hot aluminum-mercury solution at extraction pressure to cause primary crystallization resulting in fine crystallites of aluminum, which can easily be moved out of the pressure zone into a zone of virtually atmospheric pressure.

A still further object is to provide a novel method whereby fine crystallites of aluminum are in a short period of time transferred out of the pressure zone and are transformed by secondary crystallization into larger crystal entities of desired size which are suitably low in retained mercury content.

These and other objects will become apparent as the description proceeds, and are accomplished in a preferred embodiment, by the apparatus described in the specification and accompanying drawings, which are however, to be regarded as only illustrative, and not as limiting.

In accordance with the invention, a hot solution of aluminum in mercury, such as is obtainable by the extraction of aluminum metal containing material, is rapidly cooled, under pressure, to a temperature of about 360° C. or lower, preferably between 200 and 360° C., to form a slurry of fine crystallites of aluminum in fine suspension in mercury. The resulting fine aluminum crystal slurry is then transferred to a second crystallization stage or zone which is substantially at atmospheric pressure where it is held for a period of at least about 20 minutes at a temperature of about 360° C. or lower, preferably between about 300° to 360° C., to cause formation of larger aluminum crystalline entities of a size sufficient to overcome the surface tension of the mercury, and to rise through the mercury-air interface to form a dry appearing layer of larger crystal entities which are low in mercury content and which rest on the mercury surface, after which the desired coarse aluminum crystals are removed mechanically.

In a first step of the process of this invention a mixture of extremely fine aluminum crystals is made by rapid cooling, while the mixture is still under pressure. This step may be subdivided, for example, by quenching first from 550° C. to 500° or 450° C. and moving the mixture within the equipment into a space with less pressure, e.g. by means of barometric tubing providing a column of mercury sufficient to counteract boiling at 500° or 450° C., then rapidly cooling to around 360° C. or lower and moving the mixture into that part of the equipment where the secondary crystal growth is perfected. The heat is removed by suitable means. Thus, heat may be removed by externally cooled heat exchangers or by letting some of the mercury vaporize, or by combinations of such means.

In the preferred aspect of the invention, the rapid cooling or quenching of the hot aluminum-mercury solution under pressure is accomplished by mixing the hot solution with a cooler body of liquid mercury in a proportion sufficient to result in a dilute mixture, preferably having a temperature in the desired larger crystal entity formation range. The solution by the addition of mercury adds to the necessary mobility of the fine crystalline mixture. If, for example, at 550° C. an amount of 6 weight percent aluminum is dissolved, this amounts to approximately 24 volume percent of crystals, which have to be moved within 1 or 2 minutes out of the pressure zone. Longer dwelling time will cause crystal growth with the danger of accumulations of aluminum on the walls of the equipment and finally clogging of the passageways.

Thus, the mercury solution mixing and cooling step may be advantageously performed by directing streams of hot aluminum-mercury solution, at about 500°–650° C. under pressure sufficient to prevent boiling, and of cooler mercury, for example at about 100° C. into a suitable mixing vessel, resulting in a mixture having a temperature of about 300°–360° C. There is formed a slurry of fine aluminum crystals. The slurry is then permitted to rise, in a vertical vessel, which can at the same time act as a barometric column effecting a gradual reduction in pressure during the rise of the slurry. The small size of the crystals results in a free flow of the crystals and the avoidance of sticking. The flow within the transfer tube must be fairly rapid in order to avoid the occurrence of secondary crystallization within the transfer equipment. The time of transfer from the pressure zone to the zone of secondary crystallization which is substantially at normal atmospheric pressure should advisably not be longer than approximately 5 minutes, preferably within a range of 1 to 2 minutes. Otherwise, clogging of the transfer tube will occur. In their brief passage through the vertical vessel, the aluminum crystals rise to the mercury surface, with a limited number of larger crystals present gathering just below the surface or possibly just above it, while the bulk of the fine crystals forms a thickened layer underneath. In terms of volumes, the slurry, after quenching, contains advisably approximately 5 to 25 volume percent of fine aluminum crystals, the rest mercury. If more than 6%, e.g., 10–12% aluminum weight are in the original solution, it is advised to quench the solution by admixing cold mercury, thus adjusting by dilution the aluminum content in the resulting slurry to approximately 25–30 volume percent aluminum. By subjecting this slurry to secondary crystallization, the total volume splits into virtually two layers. There will be produced a buoyant layer containing on its top less than 60 volume percent mercury and more than 40 volume percent aluminum crystals and a lower layer containing on its bottom less than 3 volume percent aluminum crystals. After the secondary crystallization has begun, the larger aluminum crystals crowd themselves within the upper layer which becomes more and more concentrated.

Thus, if the original solution contains approximately 2 weight percent aluminum and 98 weight percent mercury or after recrystallization approximately 9.3 volume percent aluminum, the slurry has a quite uniform distribution of aluminum crystals immediately after the primary crystallization has been induced by quenching. After approximately 20–30 minutes at 330–350° C. an upper layer has formed, occupying about 18–20% of the total original volume and having an average concentration of approximately 40–50 volume percent of aluminum. After the dwelling time of this example, the buoyant layer has a quite distinct border comparatively like a cream layer on milk. Within the buoyant layer the upper strata is higher concentrated in aluminum and contains coarser crystals, than the lower strata.

In continuous operation, it is preferred to feed the quenched slurry from the top through the buoyant layer. While the transfer of primary crystals from the pressurized zone into the zone of secondary crystallization must be speedy enough to avoid crystal growth within the transfer line, the dimensions of the vessel of the secondary crystallization are advisably selected to provide for slow passage of the slurry through the buoyant layer, e.g. during a time of 5–10 minutes. This provision results in a stripping action. Fine crystals are filtered off and provide aluminum on which the growing larger crystals can be fed, because the small crystals will redissolve and replenish the aluminum concentration of the mother liquid from which the larger crystals grow.

For practical operational reasons, it is advisable to limit the aluminum concentration of the aluminum solution to approximately 1–6 weight percent resulting after the primary crystallization in approximately 5–25 volume percent of aluminum crystals and to allow a temperature:time relation for the secondary crystallization to achieve a buoyant layer of less than 60 volume percent mercury and more than 40 volume percent of aluminum crystals. The top layer then may be removed from the vicinity of the mercury surface for further processing, including distillation of the mercury and melting of the aluminum.

In accordance with another aspect of the invention, there is provided a novel method whereby the fine aluminum crystals are transformed into larger crystal entities of a size such that they are capable of overcoming the mercury surface tension, breaking through the mercury interface and gathering on top of the mercury surface. It has been observed that a critical size of aluminum crystals is needed to overcome the combined action of friction and surface tension, which otherwise hinder the aluminum crystals in penetrating through the mercury surface. This size is larger than 0.10 mm. taken as base length of the cubic aluminum crystal. Best results require growth to approximate 1 mm. base length or more. However, it is not easy to determine the critical size because the larger crystals always carry smaller ones with themselves.

The growth of the aluminum crystals is the faster, the higher the temperature is chosen within the preferred range of 300–360° C.; hence most desirably at or just below the boiling point of mercury. Advisably, the mercury vapor is condensed, thus maintaining atmospheric or only slightly higher pressure in the equipment. Lower temperatures, e.g., as low as 75° C., can be used, but require considerably longer time of secondary crystallization. The resulting tie-up of mercury stock is economically undesirable. The second factor determining the growth is time. Good results are achieved with a 20 minute time period though longer time is beneficial. The limitation is mainly a practical one, related to investment in mercury. However, after approximately 5–10 minutes, a heavy buoyant "cream" has formed below the mercury surface. This cream contains practically all aluminum crystals. Therefore, the lower liquid part of the original mixture, which now contains very little aluminum, can be taken off and returned to the solution vessel, while the cream alone is heated for a longer time to achieve the desired more complete separation. This can be done in the same vessel or the cream may be skimmed off into a separate vessel for more prolonged heating and consequent producing of larger crystals.

After the aluminum crystals have grown large enough and have penetrated above the mercury level, they are allowed to build up and drain. A floating layer of approximately 1 to 4″ is desirable for effective drainage. The layer should be at least ½ inch thick. There develops a gradient of "dry appearance." The layer just in contact with the mercury surface has approximately 20 weight percent aluminum. If a build-up is allowed to be approximately 2–4″, the top layer has as much as 35 weight percent aluminum, which would mean approximately 73 volume percent aluminum. The solid solubility of mercury within the aluminum crystals is reportedly approximately 6 weight percent mercury which, of course, is not appearing as liquid. Therefore, the actual crystals occupy still more than 73 volume percent.

The build-up of a layer of sizable depth of crystals which already have risen above the mercury surface, has not only the beneficial effect of drainage, but due to its weight, this layer causes an "iceberg" effect, forcing crystals underneath the surface to stay longer in contact with the "cream" layer, in which some of the aluminum crystals have not grown yet to the critical size. The mechanism of crystal growth is a mass transfer from the smallest crystals which redissolve, to the larger ones by diffusion through the liquid. This requires continued contact with the liquid. By means of the "iceberg effect," crystals which would already have the critical size are kept longer in contact with the liquid, hence grow to still larger size.

Coming back to the first step of quenching, preferably with diluting the hot aluminum solution, it is advantageous to use a part of the mercury on which the large crystals dwell for the purpose of mixing with the hot solution. At the temperature range of 300–360° C. at which crystal growth is perfected, 0.17% aluminum or 0.38% aluminum are still in solution. Some fine crystals are also still in suspension. This liquid is cooled to the temperature, desired for mixing and quenching as described. This temperature in itself is not critical. It depends on the choice of dilution and is most practically around 40–60° C. When the withdrawn liquid is cooled to this low temperature, the solubility of aluminum is reduced to less than 0.01%. Hence, almost all of the aluminum is precipitated in extremely fine form. This precipitate is used for effective nucleation in the mixing and quenching operation. As is known, the presence of a large number of nuclei causes crystallization in finer crystal entities, than if no or few nuclei are present. The objective of the quenching step is to cause fine crystals of high mobility. This is effectively promoted by the use of cooling mercury which was saturated with dissolved aluminum at 300–360° C. before it was rapidly cooled to the lower temperature, e.g. 20–100° C. with which it is mixed to the hot aluminum solution. It is preferred to adjust the amount of fine aluminum crystals, serving as nuclei to a concentration of 0.1–0.6 weight percent aluminum, suspended in the cool mercury which is mixed with the hot aluminum solution.

The method of the invention may be advantageously carried out in the apparatus described in the accompanying drawings, in which:

The appartus comprises a mixing vessel 10, which together with other portions of the apparatus, may be made of a suitable pressure and corrosion resistant metal, such as stainless steel. Inlet means for supplying hot aluminum-mercury solution to the mixing vessel includes supply conduit 11, terminating in a manifold 12 from which several tangentially disposed inlet nozzles 13 pass through the wall 14 of the mixing vessel into the interior 15 thereof. Cooled mercury supply line 16 terminates in a similar manifold 17 and set of nozzles 18 leading to the interior 15. Mounted above and in communication with mixing vessel 10 is a vertically disposed transfer tube 19, through which the fine crystal slurry formed in the mixing vessel 10 passes upward at a rapid speed, the tube 19 having smooth walls and being of a length sufficient to act as a barometric leg to maintain a pressure corresponding to the pressure necessary to prevent boiling of the hot aluminum solution. The upper end of transfer tube 19 leads via conduit 20 to a conical or other suitably shaped holding vessel 21 in which formation of larger crystal entities takes place, at mercury surface 22, above which a mass of large aluminum crystals 23 accumulates. Holding vessel 21 is equipped with conveyer 24 which is positioned above the mass of crystals 23 and spaced so that its flights skim off the aluminum crystals a short distance above the surface of the mercury. The conveyer discharges into means for further purification of the aluminum, such as distilling equipment, shown generally at 25. The holding vessel is provided with conduit 26 for drawing off mercury mother liquid. A heat exchanger 27 is connected to conduit 26, providing means for cooling the mercury to about 40° to 100° C. Thence the mercury is led via conduit 16 to mixing vessel 10, as previously described. Mercury in excess above the quantity required for mixing with quenching is withdrawn from vessel 21 by a conduit not shown in the drawing.

In the practice of the method of the invention, there may be employed as a starting material an aluminum-mercury solution obtained by the mercury extraction of an aluminum alloy, such as an aluminum-silicon alloy produced by the carbothermic reduction of an aluminous ore. The aluminum-mercury solution as obtained from the extraction system will typically have a temperature between about 500° C. and 650° C., corresponding to the concentration of aluminum, being under superatmospheric pressure sufficient to prevent boiling of the mercury. This means that the pressure will be in the range of 10 to 30 atmospheres. Under these conditions, the content of dissolved aluminum may range from 1% to as much as 20% by weight, preferably 1% to 12%.

In a first process stage, the hot aluminum-mercury solution is admixed, under pressure, with mercury at a temperature of about 60° to 100° C., in a proportion such as to produce a mixture temperature below about 360° C., the boiling point of mercury, and preferably between about 300° and 360° C. the cool mercury stream is either pure mercury, or advantageously there may be employed spent mercury mother liquid from the second crystallization stage, providing aluminum nuclei, as has been described.

The admixing of hot mercury solution and cold mercury results in the formation of a slurry of fine aluminum crystals which has sufficient fluidity for speedy transfer into the vessel in which the secondary crystallization takes place. The admixing may be carried out in the mixing vessel of the apparatus shown in the drawing.

In the second stage of the process, the aluminum crystal slurry is rapidly transferred from the pressurized mixing zone to a crystallization zone which is substantially at atmospheric pressure, or which may be maintained under a blanket of an inert gas, if desired. The depressurizing transfer is carried out, utilizing the apparatus shown in the drawing, via the crystallizer tube which is of a height sufficient to serve as a barometric leg and to maintain the mixing vessel under the mixing pressure, while at the same time discharging into the holding vessel 21 which is at atmospheric pressure. In the second stage, the fine crystal slurry is maintained at a temperature between about 300° and about 360° C. for a dwelling period of at least about 20 minutes to cause the aluminum crystals to redissolve and to recrystallize to larger crystal entities having the capacity to overcome friction and the mercury surface tension and to rise spontaneously through the mercury surface to form a dry appearing layer of coarse aluminum crystals on the surface.

The collecting of the aluminum crystals at the surface provides the opportunity for the crystals to drain and to continue to grow large enough to be picked up by the conveyor. The weight of the uppermost layer of crystals thrusts the crystals at the surface partly below the surface where they can grow further, in iceberg fashion, until large enough to attain a critical size, ranging from about 0.15 to 3 mm., preferably 0.5 to 1.0 mm., at which size they jump out of the liquid. Fully developed crystals are removed by a screw type conveyer 24 or a bucket skimmer, placed at a sufficient distance above the mercury level to give the crystals the opportunity to grow to the desired size. This distance, which may be, for example 3 to 4 inches, provides a layer of draining or dry appearing crystals, the weight of which pushes the bottommost crystals below the liquid surface, increasing their dwelling time below the mercury level and further aiding crystal growth. The dwelling time is a function of temperature, and the higher the temperature, the shorter need by the dwelling time.

The dry appearing crystals removed by the conveyor 24 contain about 25% to 35% by weight, corresponding to about 60% to 75% by volume of aluminum, and the contained mercury is recovered therefrom by distillation. Ultimately, the aluminum is melted, distilling off also the mercury which had been in solid solution within the crystals.

An advantage of the present invention is that the mercury content is held to a value such that distillation is minimized, and the need for any mechanical detachment of the mercury, as by squeezing, is avoided entirely. Another advantage is that the process can be made entirely continuous.

The following example, which is to be regarded as illustrative, and not as limiting, further illustrates the practice of the method of the invention:

Example 1

Employing the apparatus shown in the drawing, a stream of hot aluminum-mercury solution at a temperature of 540° C. under a pressure of 15 atmospheres, was introduced into a mixing vessel at a rate of 13,000 kg. per hour, corresponding to a dissolved aluminum content of 440 kg. per hour. Simultaneously there was introduced into the mixing vessel a stream of 20,400 kg. per hour of mercury at 100° C., containing about 0.012% dissolved and approximately 0.4% fine crystalline aluminum. This represented a transfer of heat at a rate of 135,000 Kcal. per hour to a resulting temperature of 350° C., maintaining at the point of mixture within the mixing vessel the pressure of 15 atmospheres. The resulting slurry of fine aluminum crystals, still under pressure, was passed through a barometric transfer tube at a rate moving the slurry within two minutes into the zone of atmospheric pressure. There it was subjected to a dwelling time in the holding vessel of 40 minutes whereby formation of large crystal entities was permitted. A layer of 100 mm. depth of crystals was maintained on the mercury surface for drainage. The coarse crystals obtained were removed continuously by conveyor and had an aluminum content of 33% by weight, the rest being adherent and occluded mercury.

What is claimed is:

1. Process for the recovery of coarse aluminum crystals from solutions of aluminum in mercury, comprising the steps of
   (a) in a first stage, rapidly cooling a hot solution of about 1% to 20% by weight of aluminum in mercury from a solution temperature corresponding to the concentration of aluminum between about 500° C. and about 650° C. to a temperature below about 360° C. in a pressure zone at a pressure sufficient to prevent boiling of the mercury, to form a slurry of fine crystals of aluminum;
   (b) in a second stage, transferring said slurry rapidly out of said pressure zone to a zone of secondary crystallization maintained at substantially atmospheric pressure;
   (c) holding the slurry in said secondary crystallization zone at a temperature below about 360° C. for a dwelling period sufficient to cause the fine slurry crystals to redissolve and to recrystallize to larger crystal entities of a size sufficient to form in the vicinity of the mercury surface a layer of coarse aluminum crystals containing at least about 20% by weight of aluminum, balance mercury; and
   (d) recovering the resulting coarse aluminum crystals.

2. The process of claim 1 in which the hot solution of aluminum in mercury is cooled to a temperature between about 300° C. and about 360° C.

3. The process of claim 1 in which the formation of larger crystal entities takes place at a temperature between about 300° C. and about 360° C. for a holding period of at least about 20 minutes.

4. The process of claim 1 in which the rapid cooling of the hot aluminum-mercury solution is performed by intimately admixing therewith a cooler body of liquid mercury in a proportion sufficient to reduce the resultant temperature to below about 360° C.

5. The process of claim 4 in which the temperature of the cooler body of mercury is about 40° to about 120° C.

6. The process of claim 4 in which the cooler body of mercury is spent mercury from the secondary crystallization zone.

7. The process of claim 6 in which the cooler body of mercury at a temperature of about 100° C. contains about 0.10%–0.60% fine crystalline aluminum by weight.

8. The process of claim 1 in which the slurry resulting from the primary crystallization is transferred to the zone of secondary crystallization within a period of time not longer than about 5 minutes.

9. The process of claim 1 in which the slurry of fine aluminum crystals obtained by rapid cooling in step (a) of primary crystallization is fed into the buoyant layer of coarser aluminum crystals during their dwelling time while they undergo secondary crystallization, thereby stripping fine crystals of the slurry and replenishing the mother liquid with aluminum for further aluminum crystal growth.

10. Process for the recovery of coarse aluminum crystals from solutions of aluminum in mercury, comprising the steps of
   (a) in a first stage, rapidly cooling a hot solution of about 1% to 20% by weight of aluminum in mercury from a solution temperature corresponding to the concentration of aluminum between about 500° C. and about 650° C. to a temperature below about 360° C. in a pressure zone at a pressure sufficient to prevent boiling of the mercury, to form a slurry of fine crystals of aluminum;

(b) in a second stage, transferring said slurry rapidly out of said pressure zone to a zone of secondary crystallization maintained at substantially atmospheric pressure;

(c) holding the slurry in said secondary crystallization zone at a temperature below about 360° C. for a dwelling period sufficient to cause the fine slurry crystals to redissolve and to recrystallize to larger crystal entities of a size sufficient to rise spontaneously through the mercury surface to form a layer of coarse aluminum crystals on said surface; and (d) recovering the resulting coarse aluminum crystals.

11. The process of claim 10 in which the crystal entities have an average size between about 0.15 and 3 mm.

12. The process of claim 10 in which the formation of large crystal entities is performed by maintaining a body of the coarse aluminum crystals on the mercury surface, said body having a depth of at least about 0.5 inch sufficient to hold forming crystal entities partly below the mercury surface until said entities have attained sufficient size to rise completely above said surface.

13. Process for the recovery of a mixture of mercury and aluminum crystals from a solution of aluminum in mercury, said recovered mixture having a higher aluminum content than the aluminum solution, comprising the steps of:

(a) in a first stage, rapidly cooling a hot solution of about 1% to 12% by weight of aluminum in mercury from a solution temperature corresponding to the concentration of aluminum between about 500° C. and about 650° C. to a temperature below about 360° C. in a pressure zone at a pressure sufficient to prevent boiling of the mercury, to form a slurry of fine crystals of aluminum in mercury, said slurry containing between about 5 and about 30 percent by volume of aluminum crystals and between about 95 and about 70 percent by volume of mercury;

(b) in a second stage, transferring said slurry rapidly out of said pressure zone to a zone of secondary crystallization maintained at substantially atmospheric pressure;

(c) holding the slurry in said secondary crystallization zone at a temperature below about 360° C. for a dwelling period sufficient to cause the fine slurry crystals to redissolve and to recrystalize to larger crystal entities of a size sufficient to rise and form a buoyant layer of less than about 60 percent by volume of mercury and more than about 40 percent by volume of aluminum crystals; and (d) separating said layer from the remainder of the slurry.

14. The process of claim 13 in which the slurry of fine aluminum crystals obtained by rapid cooling in step (a) of primary crystallization is fed into the buoyant layer of coarser aluminum crystals during their dwelling time while they undergo secondary crystallization, thereby stripping fine crystals of the slurry and replenishing the mother liquid with aluminum for further aluminum crystal growth.

References Cited

UNITED STATES PATENTS

| 3,102,805 | 9/1963 | Messner | 75—68 |
| 3,301,666 | 1/1967 | Martin | 75—68 |

FOREIGN PATENTS

| 557,861 | 5/1958 | Canada. |

DAVID L. RECK, *Primary Examiner.*

H. W. TARRING, *Assistant Examiner.*